United States Patent
Stanhope et al.

(10) Patent No.: US 12,550,811 B2
(45) Date of Patent: Feb. 17, 2026

(54) AGRICULTURAL ROW UNIT SYSTEM AND METHOD

(71) Applicant: CNH Industrial America LLC, New Holland, PA (US)

(72) Inventors: Trevor Stanhope, Oak Lawn, IL (US); Michael Christopher Conboy, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 330 days.

(21) Appl. No.: 17/854,887

(22) Filed: Jun. 30, 2022

(65) Prior Publication Data
US 2024/0000005 A1  Jan. 4, 2024

(51) Int. Cl.
*A01C 7/20* (2006.01)
*A01C 5/06* (2006.01)

(52) U.S. Cl.
CPC ............. *A01C 7/203* (2013.01); *A01C 5/064* (2013.01)

(58) Field of Classification Search
CPC ......... A01C 7/203; A01C 5/064; A01C 5/068; A01C 5/066
See application file for complete search history.

(56) References Cited

U.S. PATENT DOCUMENTS

| | | | |
|---|---|---|---|
| 4,116,140 A | 9/1978 | Anderson et al. | |
| 9,681,601 B2 | 6/2017 | Bassett | |
| 9,848,524 B2 | 12/2017 | Sauder et al. | |
| 9,930,826 B2 | 4/2018 | Mccloskey | |
| 10,555,454 B2 | 2/2020 | Garner et al. | |
| 10,932,405 B2 | 3/2021 | Koch et al. | |
| 11,140,808 B2 | 10/2021 | Al. | |
| 11,547,036 B2* | 1/2023 | Strnad | A01C 7/203 |
| 11,818,977 B2* | 11/2023 | Anderson | A01C 7/002 |
| 2002/0174813 A1* | 11/2002 | Hagny | A01C 7/006 111/189 |
| 2008/0295750 A1* | 12/2008 | Gregor | A01C 7/06 111/164 |
| 2011/0000410 A1* | 1/2011 | Manasseri | A01C 7/208 111/163 |
| 2011/0282556 A1 | 11/2011 | Klenz et al. | |
| 2012/0048159 A1* | 3/2012 | Adams | A01C 7/203 111/163 |

(Continued)

FOREIGN PATENT DOCUMENTS

| | | |
|---|---|---|
| CN | 103548432 | 2/2014 |
| CN | 108983724 | 11/2019 |

OTHER PUBLICATIONS

"FurrowForce," Precision Planting, Feb. 7, 2022 (11 pages) https://www.precisionplanting.com/products/product/furrowforce.

*Primary Examiner* — Sze-Hon Kong
(74) *Attorney, Agent, or Firm* — Dority & Manning, P.A.

(57) ABSTRACT

A system for a row unit of a planting implement includes a frame and a closing sensor assembly configured to capture data indicative of a position of a component of a closing assembly relative to the frame. A computing system is communicatively coupled to the closing sensor assembly. The computing system is configured to receive the data from the closing sensor assembly, determine a press wheel height relative to the frame, determine a height variance between the opening disk and the press wheel height, and generate a control action based on the variance.

14 Claims, 9 Drawing Sheets

(56) References Cited

U.S. PATENT DOCUMENTS

| | | | |
|---|---|---|---|
| 2012/0316673 A1* | 12/2012 | Riffel | A01B 63/32 |
| | | | 700/240 |
| 2014/0224513 A1* | 8/2014 | Van Buskirk | A01B 49/027 |
| | | | 172/260.5 |
| 2018/0317380 A1* | 11/2018 | Bassett | A01C 7/205 |
| 2019/0045703 A1* | 2/2019 | Bassett | A01C 5/066 |
| 2019/0124824 A1* | 5/2019 | Hubner | A01C 7/205 |
| 2019/0186911 A1 | 6/2019 | Do Amaral Assy et al. | |
| 2019/0246553 A1* | 8/2019 | Fels | A01C 7/201 |
| 2020/0096019 A1* | 3/2020 | Schrader | F15B 1/033 |
| 2020/0146200 A1* | 5/2020 | Schoeny | A01C 5/068 |
| 2020/0221629 A1* | 7/2020 | Martin | A01C 7/006 |
| 2020/0236873 A1* | 7/2020 | Albrecht | A01G 13/0287 |
| 2020/0281107 A1* | 9/2020 | Stanhope | A01B 79/02 |
| 2020/0396894 A1* | 12/2020 | Radtke | A01B 15/16 |
| 2021/0037695 A1* | 2/2021 | Strnad | G01B 15/00 |
| 2021/0100157 A1* | 4/2021 | Martin | A01C 7/08 |
| 2022/0022363 A1* | 1/2022 | Martin | A01C 5/066 |
| 2022/0117148 A1* | 4/2022 | Collin | A01C 5/068 |
| 2022/0124966 A1* | 4/2022 | Barker | A01C 7/206 |
| 2022/0240439 A1* | 8/2022 | Schaffert | A01C 7/06 |
| 2022/0272888 A1* | 9/2022 | Hodel | A01B 63/008 |
| 2024/0251698 A1* | 8/2024 | Radtke | A01C 5/068 |
| 2024/0306524 A1* | 9/2024 | Sandberg | A01C 5/064 |

\* cited by examiner

AGRICULTURAL ROW UNIT SYSTEM AND METHOD

FIELD

The present disclosure relates generally to planting operations performed using a planting implement, such as a planter or a seeder, and, more particularly, to systems and methods for determining a position of various components of a row unit of the planting implement.

BACKGROUND

Planting implements may be employed to deposit an agricultural product, such as a seed, fertilizer, pesticide, and other chemicals and materials, into soil. In some cases, the planting implements can include one or more furrow-forming tools or openers that excavate a furrow or trench in the soil. One or more dispensing devices of the planting implements may, in turn, deposit the agricultural product into the furrow. After deposition of the agricultural product, a closing assembly may close the furrow in the soil, such as by pushing the excavated soil into the furrow.

In some instances, the closing assembly may vary a post-worked depth of the agricultural field from the pre-worked depth of the agricultural field. Accordingly, improved systems and methods for determining the post-worked depth of the agricultural field would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for a row unit of a planting implement. The system includes a frame and a closing sensor assembly configured to capture data indicative of a position of a component of a closing assembly relative to the frame. A computing system is communicatively coupled to the closing sensor assembly. The computing system is configured to receive the data from the closing sensor assembly; determine a press wheel height relative to the frame; determine a height variance between the opening disk and the press wheel height; and generate a control action based on the variance.

In some aspects, the present subject matter is directed to a method for an agricultural operation. The method includes receiving, from a sensor system, data indicative of a press wheel height relative to the frame of the implement. The method also includes determining, with a computing system, a detected seed depth based on a press wheel height relative to a frame of an implement.

In some aspects, the present subject matter is directed to a system for a row unit of a planting implement. The system comprises a frame; a press wheel; a press wheel arm pivotably coupling the press wheel to the frame; and a closing sensor assembly configured to capture data indicative of a magnitude of rotation of the press wheel relative to the frame.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
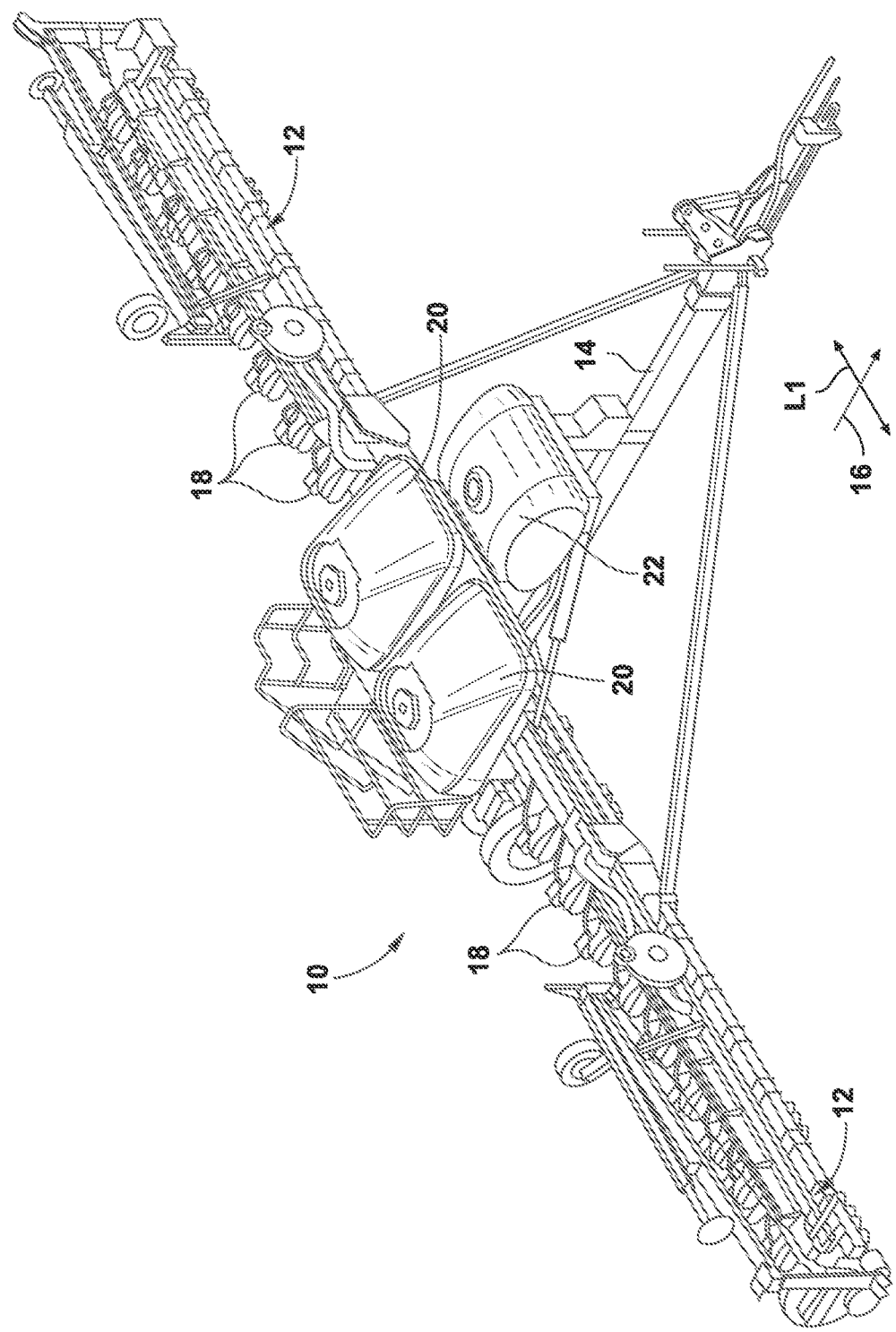
FIG. 1 illustrates a perspective view of a planting implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a material within a fluid circuit. For example, "upstream" refers to the direction from which a material flows, and "downstream" refers to the direction to which the material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for a row unit of a planting implement. Each row unit can include ground engaging components (e.g., a residue management assembly, an opening assembly, and a closing assembly) that conform soil of the field, form a row in the field (i.e., a furrow, furrow, cut, and/or opening in a seedbed), deposit agricultural product into the row, and close the row as the agricultural implement is towed through the field. For example, the residue management assembly clears the surface of the field of residue (e.g., clods, debris, etc.) as the row unit moves over the surface. The opening assembly then penetrates the soil of the field to form the row. After forming the row, an agricultural product (e.g., seed, fertilizer, etc.) may be delivered to the soil by each respective row unit to the rows (i.e., into the furrow). For example, the agricultural product may include seeds that mature into a harvestable crop. After delivery of the agricultural product to the row, the closing assembly of each respective row unit places soil into the row and over the seeds. The closing assembly may partially or completely fill the furrow of the row with the soil.

In some instances, the row unit can include a frame and a closing sensor assembly configured to capture data indicative of a position of a component of a closing assembly relative to the frame. The system may also include a computing system communicatively coupled to the closing sensor assembly. The computing system may be configured to receive the data from the closing sensor assembly. In response, the computing system may be configured to determine a press wheel height relative to the frame. In some examples, the press wheel height may be determined based on a position of a closing assembly arm relative to the frame through one or more algorithms, look-up tables, and/or any other manner.

The computing system may further be configured to determine a variance between the opening disk depth and the press wheel height. Based on the variance, the computing system may determine an actual seed depth. For instance, if the variance between the opening disk depth and press wheel height is equal to the defined depth, the computing system can determine that the seed depth is generally equal to the defined depth. However, if the variance is greater than or less than the defined depth, the computing system can determine that detected seed depth is greater than or less than defined depth.

In some instances, the computing system may determine a difference between the detected seed depth, based on the variance, and a defined seed depth. Based on the variance, the variance exceeding a defined range, the difference, and/or the difference deviating from a defined range, the computing system may further be configured to perform a control action, such as notify an operator of the variance and/or adjust one or more components of the system. For example, the computing system may alter one or more operating parameters of the opening assembly and/or the closing assembly. For instance, the computing system may increase a defined opening disk depth so that the seed may be positioned at a defined depth below the surface of the soil.

Accordingly, the systems and methods described herein can lead to more consistent seed deposition into a field. In turn, favorable harvesting results may be accomplished with minimal costs and adaptations to the implement.

Referring now to drawings, FIG. 1 illustrates a perspective view of a planting implement 10 (e.g., a planter) in accordance with aspects of the present subject matter. As shown in FIG. 1, the implement 10 may include a toolbar or frame assembly 12 extending along a lateral direction L1 and connected to a forwardly extending tow bar 14 to allow the implement 10 to be towed by a work vehicle, such as an agricultural tractor, in a forward direction of travel (e.g., as indicated by arrow 16). The frame assembly 12 may generally be configured to support a plurality of seed planting units, or row units 18. Each row unit 18 may be configured to deposit seeds at a defined depth beneath the soil surface and at a desired seed spacing as the implement 10 is being towed by the work vehicle, thereby establishing rows of planted seeds.

In some examples, the seeds to be planted may be stored in one or more hoppers or seed tanks 20. As the row units 18 plant the seeds, a pneumatic distribution system may distribute additional seeds from the seed tanks 20 to the individual row units 18 via one or more delivery lines. Additionally, one or more fluid tanks 22 may store agricultural products, such as insecticides, herbicides, fungicides, fertilizers, and/or the like, which may also be applied to the field.

It will be appreciated that, for purposes of illustration, only a portion of the row units 18 of the implement 10 have been shown in FIG. 1. In general, the implement may include any number of row units 18, such as 6, 8, 12, 16, 24, 32, or 36 row units. In addition, it will be appreciated that the lateral spacing between row units 18 along the lateral direction L1 may be selected based on the type of crop being planted. For example, the row units 18 may be spaced approximately 30 inches from one another for planting corn, and approximately 15 inches from one another for planting soybeans.

It will also be appreciated that the configuration of the implement 10 described above and shown in FIG. 1 is provided only to place the present subject matter in a field of use. Thus, it will be appreciated that the present subject matter may be readily adaptable to any manner of planter configuration, or any other planting implement configuration, including seeders.

Figure 2:
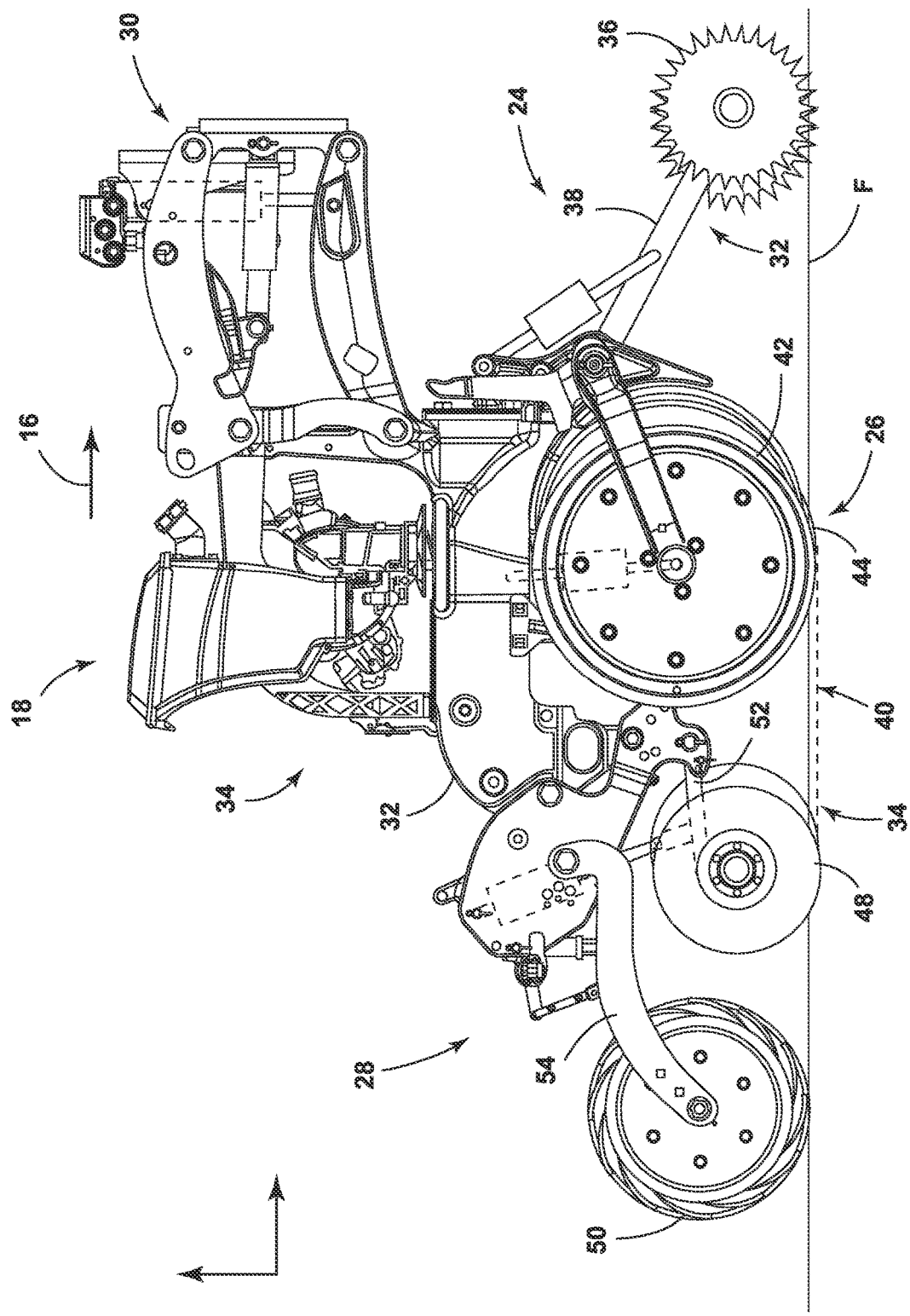
FIG. 2 illustrates a side view of a row unit suitable for use with a planting implement in accordance with aspects of the present subject matter.

Referring now to FIG. 2, a side view of a row unit 18 is illustrated in accordance with aspects of the present subject matter. As shown, each row unit 18 can include ground engaging components (e.g., a residue management assembly 24, an opening assembly 26, and a closing assembly 28) that conform soil of the field, form a row in the field (i.e., a furrow, furrow, cut, and/or opening in a seedbed), deposit agricultural product into the row, and close the row as the agricultural implement 10 is towed through the field. For example, the residue management assembly 24 clears the surface of the field of residue (e.g., clods, debris, etc.) as the row unit 18 moves over the surface. The opening assembly 26 then penetrates the soil of the field to form the row. After forming the row, an agricultural product (e.g., seed, fertilizer, etc.) may be delivered to the soil by each respective row unit 18 to the rows (i.e., into the furrow). For example, the agricultural product may include seeds that mature into a harvestable crop. After delivery of the agricultural product to the row, the closing assembly 28 of each respective row unit 18 places soil into the row and over the seeds. The closing assembly 28 may partially or completely fill the furrow of the row with the soil.

As illustrated, the row unit 18 can include a linkage assembly 30 that couples a frame 32 of the row unit 18 to the frame assembly 12 of the agricultural implement 10. As the agricultural implement 10 is towed through the field, the row unit 18 is also towed through the field. The row unit 18 is configured to deposit the agricultural product (e.g., the seeds, the fertilizer, etc.) into the field. For example, the row unit 18 includes the agricultural product delivery system 34. The agricultural product delivery system 34 stores the agricultural product for deposition by the row unit 18. In various examples, multiple row units 18 may share an agricultural product delivery system 34. The agricultural product delivery system 34 may include a metering system that meters the agricultural product in a predetermined fashion. For example, the metering system may include a vacuum, a mechanical metering wheel, other metering mechanisms, or a combination thereof.

As illustrated, the row unit 18 includes the residue management assembly 24 positioned generally in front of the opening assembly 26 along the direction of travel 16. The residue management assembly 24 includes residue managers 36 (e.g., rolling tines, blades, or disks) that clear the surface of the field of debris (e.g., clods, crop residue, etc.) as the row unit 18 moves over the surface. The residue managers 36 are coupled to the row unit 18 via residue manager linkages 38 in front of and adjacent to the opening assembly 26 (e.g., generally below the linkage assembly 30). As the row unit 18 travels across the field, the residue manager 36 may rotate and conform to the soil of the field in a manner that enables the opening assembly 26 to form a furrow 40. For example, the residue managers 36 may break apart clods of the soil, move residue and/or debris out of a pathway of the row unit 18, level out the soil, or a combination thereof. In certain embodiments, the residue management assembly 24 may include other mechanisms in addition to or instead of the residue managers 36 that engage the soil and manage the residue.

As illustrated, the opening assembly 26 of the row unit 18 includes one or more gauge wheels 42 and/or one or more opening disks 44. The opening disks 44 penetrate a top surface of the field to form the furrow 40 along the row of the row unit 18. The gauge wheels 42 rotate along the top surface of the field beside the row and provide a reference level from which the opening disks 44 forms the furrow 40. For example, the opening disks 44 and/or the gauge wheels 42 may be vertically adjustable to enable the operator to set a desired depth of the furrow 40. As the opening disks 44 penetrate the field, the furrow 40 is formed in the soil.

As illustrated, the closing assembly 28 of the row unit 18 can include one or more closing disks 48 and/or a press wheel 50. The closing disks 48 and the press wheel 50 may form a two-stage closing assembly of the row unit 18. In the illustrated example, the closing disks 48 include a closing disk 48 disposed on each side of the furrow 40. The pair of closing disks 48 may be axially offset by a fixed or an adjustment spacing. Further, to at least partially close the furrow 40, a first closing disk 48 fractures and/or mixes the soil from a first side of the furrow 40 into the furrow 40, and then a second closing disk 48 fractures and/or mixes the soil from a second side of the furrow 40 into the furrow 40. Additionally, each closing disk 48 may be disposed at an angle relative to the furrow 40. For example, the top end portion of the closing disk 48 may be closer than the bottom end portion of the closing disk 48. In some embodiments, the row unit 18 may include a single closing disk 48 that moves the soil into the furrow 40. The closing disks 48 are coupled to the row unit 18 (e.g., to the frame 32) via a closing disk arm 52.

The press wheel 50 can be configured to compact the soil in the furrow 40 and/or to further fill the furrow 40 with the soil. The press wheel 50 may be axially wider than the furrow 40 such that the press wheel 50 contacts the first side of the furrow 40 and the second side of the furrow 40. As the press wheel 50 rolls over the furrow 40, the press wheel 50 applies a downward force to the field that compacts the soil. For example, to properly close the furrow 40, the press wheel 50 compacts the soil in the furrow 40 to be at generally the original ground level (e.g., the level of the soil on the first side and the second side of the furrow 40). The press wheel 50 can be coupled to the row unit 18 (e.g., to the frame 32) via a press wheel arm 54.

In certain embodiments, the closing disks 48 or the press wheel 50 may be omitted from the closing assembly 28 such that the closing assembly 28 of the row unit 18 includes a single stage (e.g., only the closing disks 48 or only the press wheel 50). Additionally, in certain cases, the closing assembly 28 may include a single closing disk 48 and/or the press wheel 50. Further, some embodiments of the single-stage closing assembly may include closing disks 48 disposed at angles other than those described above for the closing disks 48.

Figure 3:
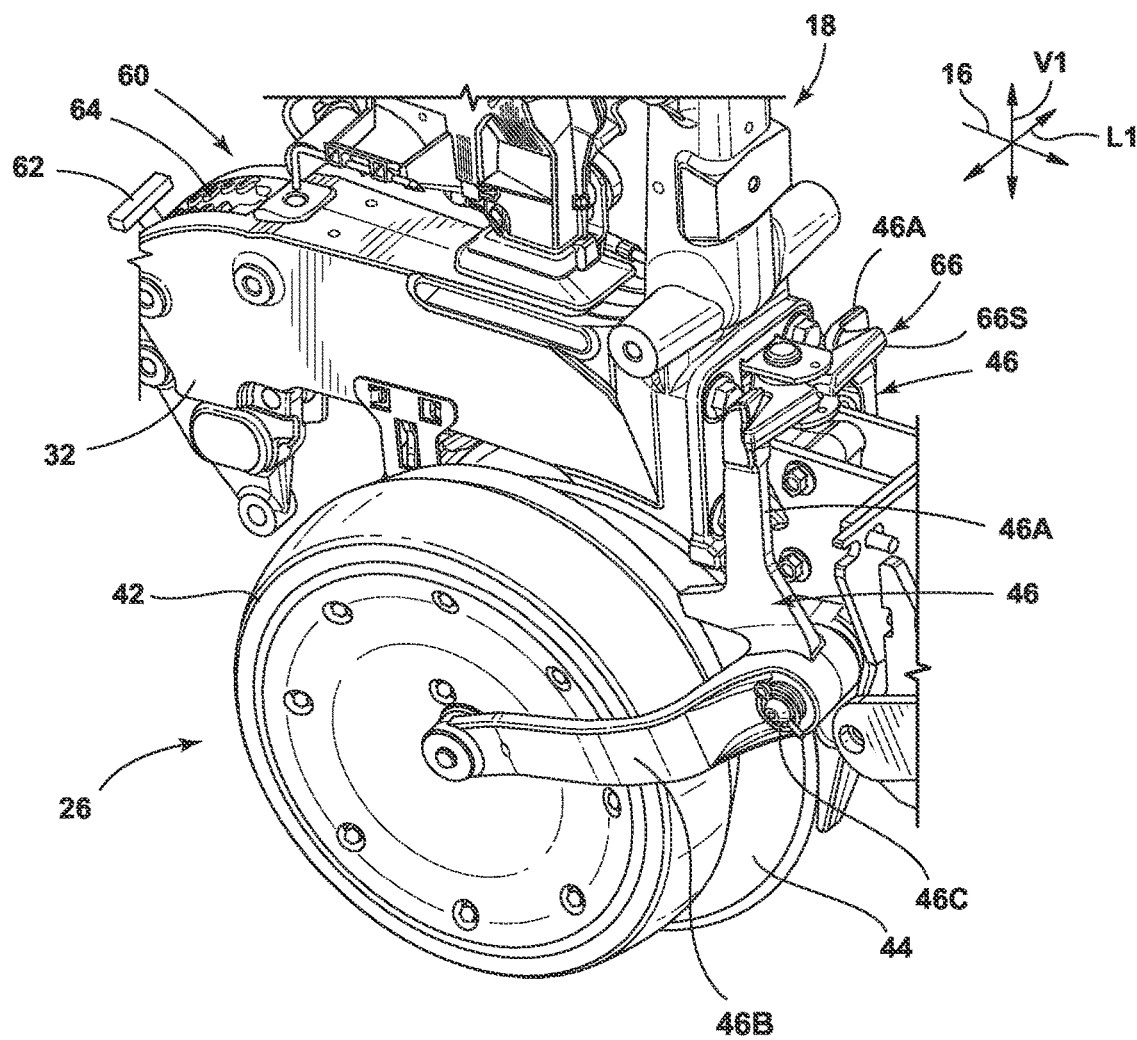
FIG. 3 illustrates a perspective view of an opening assembly in accordance with aspects of the present subject matter.

With reference to FIG. 3, the row unit 18 may include a gauge wheel adjustment assembly 60 for adjusting the position of the gauge wheels 42 and, thus, the penetration depth of the opening disks 44 and the depth of the furrow 40. In various examples, the gauge wheel adjustment assembly 60 can include a handle 62 that is selectively positionable at different positions along a toothed slot 64 in the frame 32, with each of the positions being associated with a different position of the gauge wheel 42 relative to the frame 32. For instance, each of the gauge wheel arms 46 can have an upper portion 46A and a lower portion 46B disposed at an angle relative to each other about the rotational joint 46C. The upper portions 46A of the gauge wheel arms 46 can rest against a respective depth stop 66S at a forward end portion of a rocker bar 66 when the gauge wheels 42 are in contact with a ground surface. As the handle 62 is moved along the slot 64, the rocker bar 66 can move generally in a direction of travel 16. In some cases, when the rocker bar 66 is slid forward in the direction of travel 16, the depth stops 66S are also moved forward relative to the direction of travel 16. As the depth stops 66S move forward, the gauge wheel arms 46 are allowed to rotate about the rotational joints 46C to move the gauge wheels 42 relative to the frame 32. Conversely, when the rocker bar 66 is slid rearward (e.g., opposite the direction of travel 16), the depth stops 66S are also moved rearward relative to the direction of travel 16, which allows the gauge wheel arms 46 to rotate about the rotational joints 46C in the opposite direction to move the gauge wheels 42 relative to the frame 32.

It will be appreciated that, in addition to, or alternatively to, the handle 62 that is manually slidable relative to the toothed slot 64, a gauge wheel actuator 68 may be provided that is controllable to move the rocker bar 66 relative to the frame 32 and/or one or both of the gauge wheel arms 46 relative to the frame 32.

Figure 4:
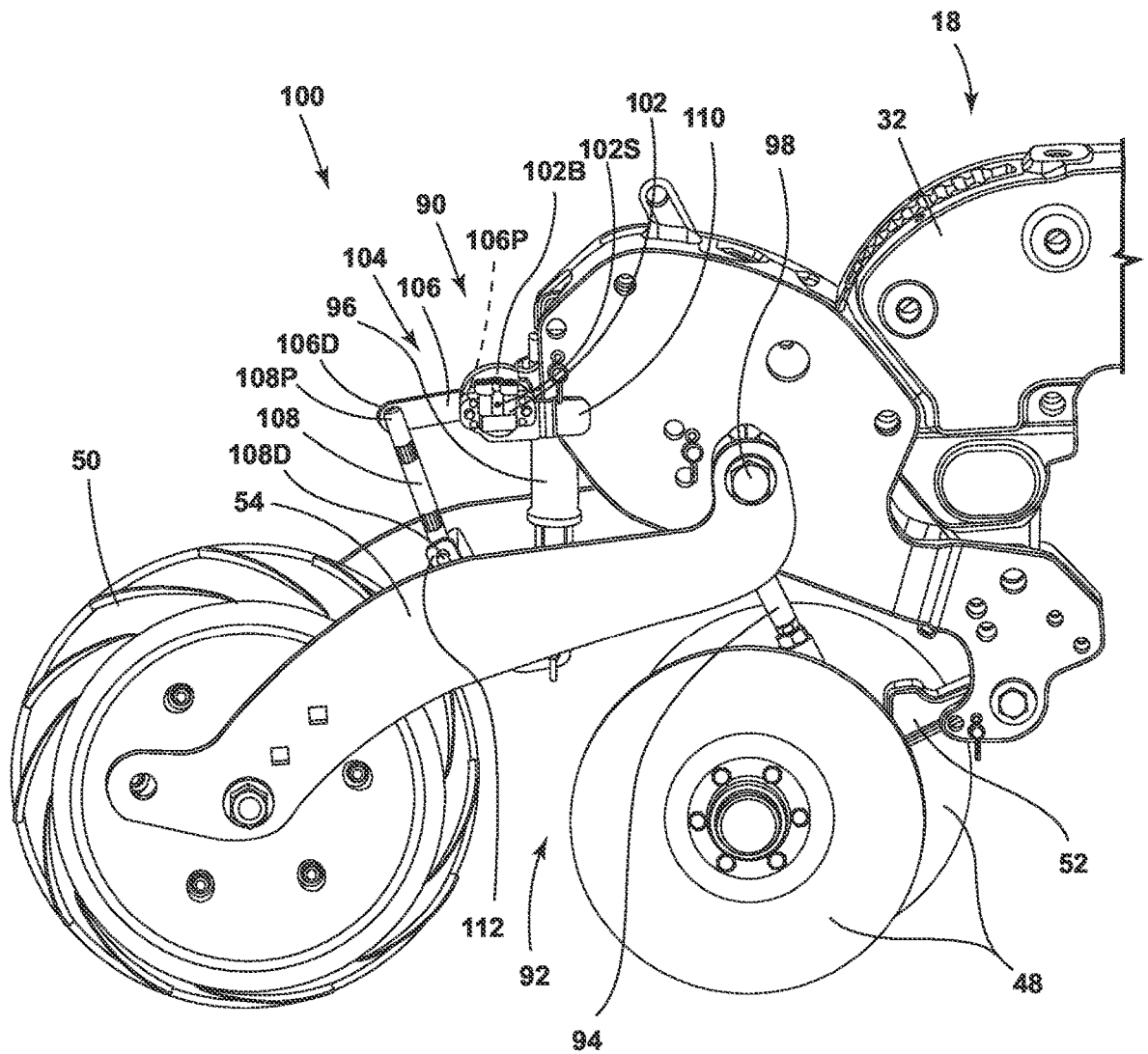
FIG. 4 illustrates a perspective view of a closing assembly operably coupled with the sensor system in accordance with aspects of the present subject matter.
Figure 5:
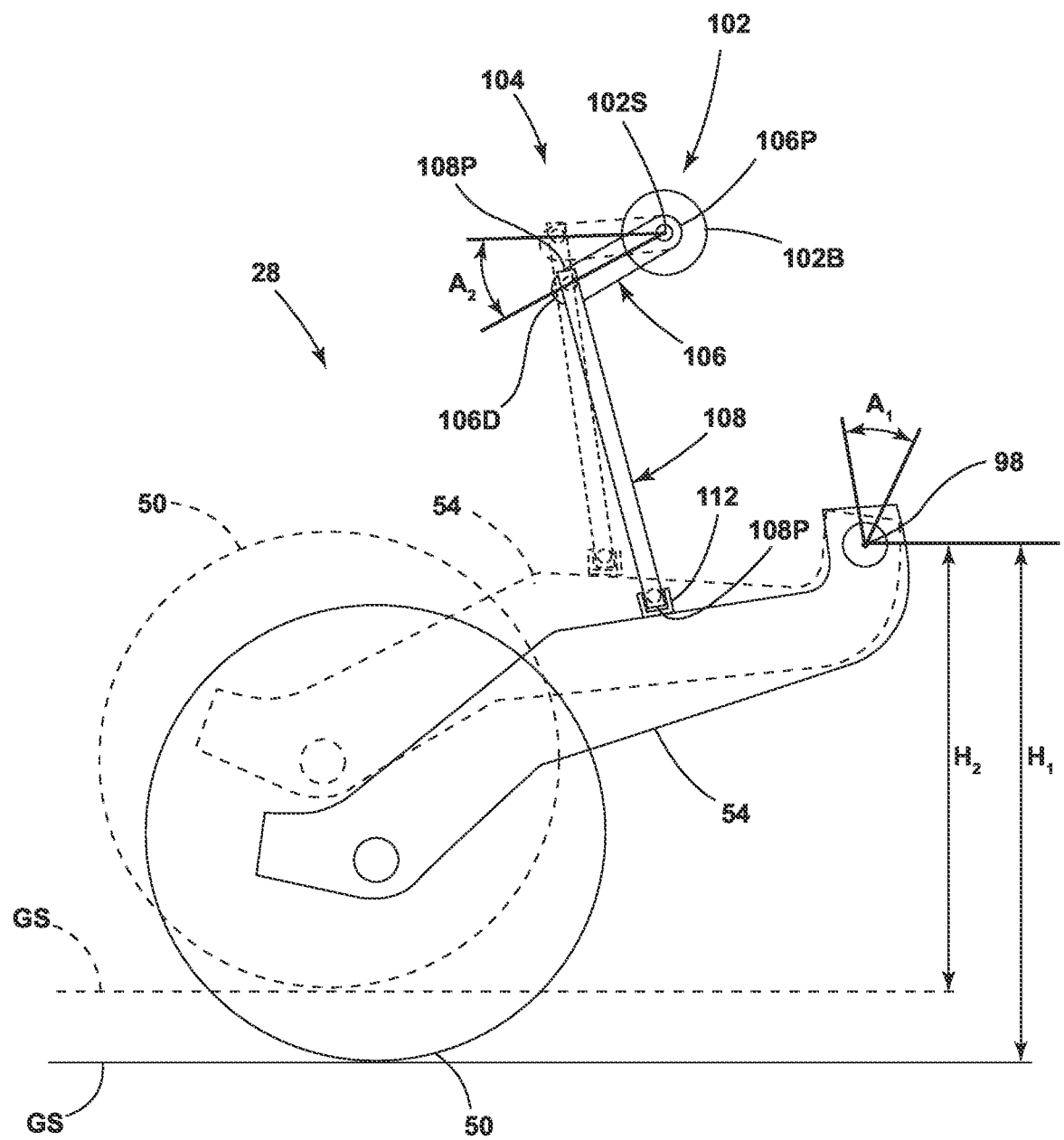
FIG. 5 illustrates a schematic view of the closing assembly and the sensor system in accordance with aspects of the present subject matter.
Figure 6:
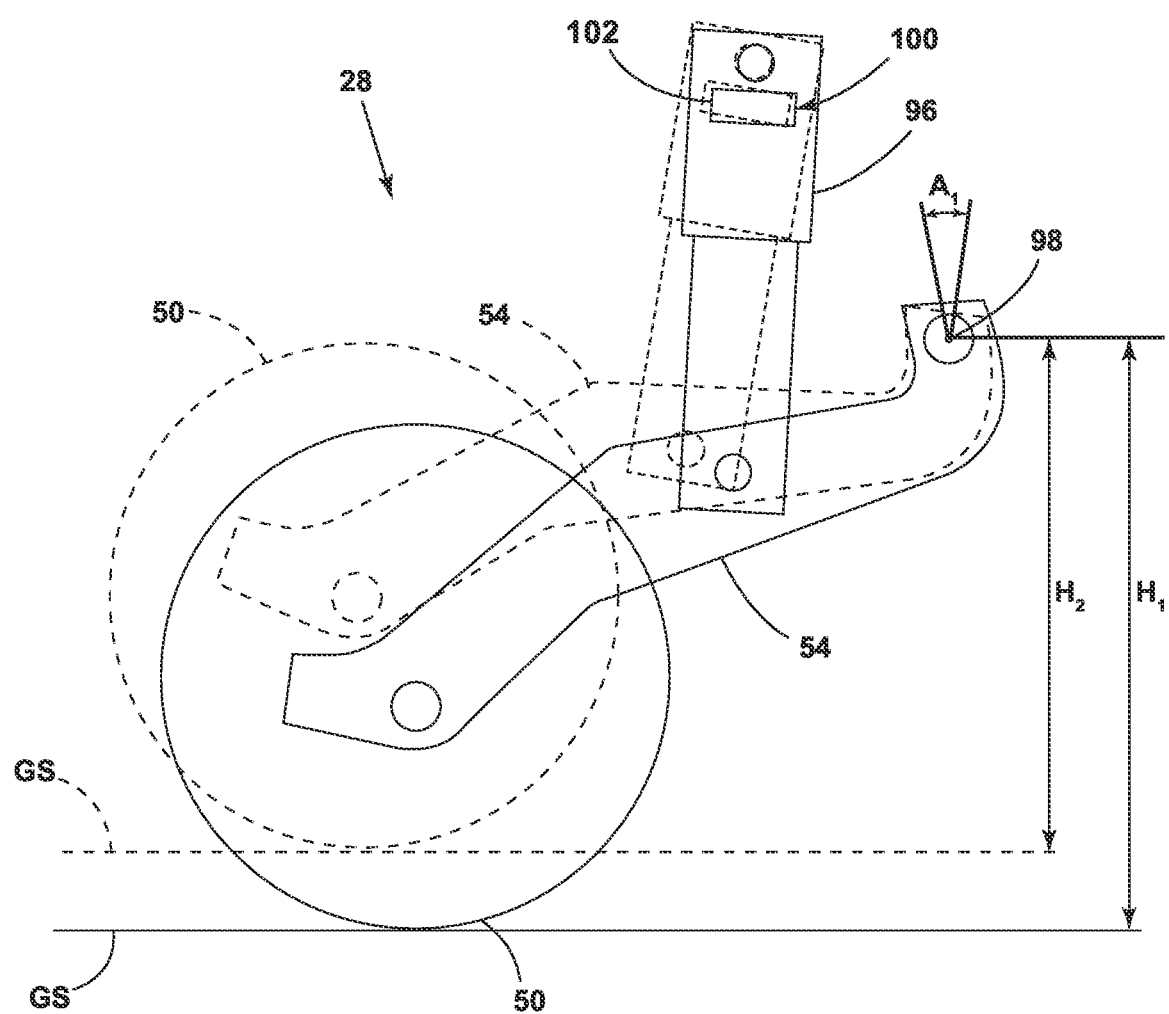
FIG. 6 illustrates a schematic view of the closing assembly and the sensor system in accordance with aspects of the present subject matter.

With reference to FIGS. 4-6, in various examples, the closing assembly 28 also includes a linkage assembly 90 and an actuator assembly 92. In various examples, the linkage assembly 90 may include the closing disk arm 52 operably coupling the one or more closing disks 48 with the frame 32 and/or the press wheel arm 54 operably coupling the press wheel 50 with the frame 32. In various examples, the closing disk arm 52 and/or the press wheel arm 54 can be configured to pivot relative to the frame 32.

The actuator assembly 92 can include a closing disk actuator 94 coupled to the one or more closing disks 48 and the linkage assembly 90 and a press wheel actuator 96 coupled to the press wheel 50 and the linkage assembly 90.

The closing disk actuator 94 is configured to adjust a generally vertical position and/or angle of the one or more closing disks 48 relative to the soil to enable the one or more closing disks 48 to move more or less of the soil into the furrow 40. As illustrated, the one or more closing disks 48 may be disposed generally perpendicular to the soil. The press wheel actuator 96 may adjust a generally vertical position and/or down pressure of the press wheel 50 to adjust the amount of pressure that the press wheel 50 applies to the soil.

In some cases, as the position of the press wheel 50 is altered as the press wheel 50 moves along the soil, the press wheel arm 54 rotates about a rotational joint 98 to move the press wheel 50 relative to the frame 32, such as from the solid-lined positions to the dashed-lined positions shown in FIGS. 5 and 6. Such movement of the press wheel 50 moves the rotational joint 98 in a first direction relative to the frame 32. Conversely, when the press wheel 50 rotates about the rotational joint 98 in the opposite direction relative to the frame 32 (e.g., from the dashed-lined positions to the solid-lined positions shown in FIGS. 5 and 6), the amount of soil positioned on the furrow 40 may be less than the amount of soil illustrated by the dashed line positions in FIGS. 5 and 6.

With further reference to FIGS. 4-6, a sensor system 70 may include a closing sensor assembly 100 provided in operative association with the press wheel 50 of one or more of the row units 18. In various examples, each closing sensor assembly 100 may include a position sensor 102 that can capture data that is indicative of the position of an associated press wheel arm 54 and, thus, the position of the respective press wheel 50 relative to the frame 32.

In some examples, such as those illustrated in FIGS. 4 and 5, the position sensor 102 can be coupled to the press wheel 50 by a respective linkage assembly 104. The linkage assembly 104 can include at least a first sensor link 106 and a second sensor link 108. The first sensor link 106 extends along a first length between a proximal end portion 106P and a distal end portion 106D. Similarly, the second sensor link 108 extends along a second length between a proximal end portion 108P and a distal end portion 108D. For instance, the position sensor 102 can be configured as a rotational sensor having a rotational shaft 102S defining an axis about which the rotational shaft 102S is configured to rotate relative to a sensor body 102B, where the position sensor 102 generates data indicative of the rotational position (e.g., a magnitude of rotation) of the rotational shaft 102S relative to the sensor body 102B. In some instances, the position sensor 102 (e.g., the sensor body 102B) is coupled to the frame 32 by a mounting bracket 110. However, in other embodiments, the position sensor 102 may be coupled relative to the frame 32 in any other suitable manner. Moreover, it will be appreciated that the position sensor 102 may be configured as any other suitable sensor.

The proximal end portion 106P of the first sensor link 106 can be coupled to the position sensor 102. For example, the proximal end portion 106P of the first sensor link 106 can be operably coupled to the rotational shaft 102S of the position sensor 102 such that rotation of the first sensor link 106 causes rotation of the rotational shaft 102S of the position sensor 102. Further, the distal end portion 106D of the first sensor link 106 can be coupled to the proximal end portion 108P of the second sensor link 108. For instance, the distal end portion 106D of the first sensor link 106 can be coupled to the proximal end portion 108P of the second sensor link 108 such that the first and second sensor links 108 may rotate relative to each other. Moreover, the distal end portion 108D of the second sensor link 108 can be coupled to the press wheel arm 54. In various examples, the distal end portion 108D of the second sensor link 108 is coupled to the gauge wheel arm 46 such that the second sensor link 108 is rotatable relative to the gauge wheel arm 46. In some cases, the distal end portion 108D of the second sensor link 108 can be operably coupled to the press wheel arm 54. Additionally or alternatively, as shown in FIGS. 4 and 5, the closing sensor assembly 100 can further include a tab 112 coupled between the second sensor link 108 and the gauge wheel arm 46 to help bridge any gap (e.g., in the lateral direction L1, perpendicular to the direction of travel 16) that may exist between the second sensor link 108 and the press wheel arm 54. For instance, the tab 112 may include a first tab end section coupled to the distal end portion 108D of the second sensor link 108 and a second tab end section coupled to the press wheel arm 54. In some instances, the first and second tab end sections can be non-parallel relative to each other.

As the press wheel 50 travels along the furrow 40, the vertical position of the press wheel 50 may vary based on the topography of the furrow 40. To accommodate the varied topography, such as the press wheel 50 moving to a higher position, the press wheel arm 54 can pivot clockwise about the rotational joint 98, such as by a first angle $A_1$ from the solid-lined position to the dashed-lined position shown in FIG. 5. Such pivoting of the press wheel arm 54 further causes the second sensor link 108, and the optional tab 112, to be moved rearward relative to the direction of travel 16, from the solid-lined positions to the dashed-lined positions shown in FIG. 5. As the second sensor link 108 moves, the proximal end portion 108P of the second sensor link 108 pulls or pushes the distal end portion 106D of the first sensor link 106 from the solid-lined positions to the dashed-lined positions shown in FIG. 5. Due to the connection between the position sensors 102 (e.g., the rotational shafts 102S) and the proximal end portion 106P of the first sensor link 106, the first sensor link 106 rotates through a second angle $A_2$ (e.g., with the rotational shafts 102S) as the second sensor link 108 pulls or pushes the distal end portion 106D of the first sensor link 106 forward relative to the direction of travel 16, from the solid-lined positions to the dashed-lined positions shown in FIG. 5. It will be appreciated that the movements of the closing sensor assembly 100 are reversed when the press wheel 50 moves downwardly relative to the frame 32.

Accordingly, the position sensor 102 may capture data indicative of the rotational position of the rotational shaft 102S, where the first sensor link 106 moves the rotational shaft 102S according to the movement of the gauge wheel arm 46. As such, the data generated by the position sensors 102 may be correlated to the rotational position of the respective press wheel arm 54 about the associated rotational joint 98, the position of the associated press wheel 50 relative to the frame 32, the position of the associated press wheel 50 relative to the ground, and/or the depth of the associated furrow 40.

With further reference to FIG. 6, in addition to, or alternatively to, the position sensor 102 described in FIG. 5, the closing sensor assembly 100 may include a position sensor that is integrated within or otherwise coupled with the press wheel actuator 96. In various examples, the press wheel actuator 96 may correspond to a fluid-driven actuator, such as a hydraulic or pneumatic cylinder, a biasing member, such as a spring, and/or any other device. In this respect, the press wheel actuator 96 may be configured to apply a down force or pressure through the frame 32 to the press wheel 50.

As shown in FIG. 6, the one or more position sensors 102 may be provided in operative association with the press wheel actuator 96. For example, in various examples, the one or more position sensors 102 may be configured as a pressure sensor provided in operative association with the press wheel actuator 96. In general, the pressure sensors may be configured to detect or measure a pressure of a fluid supplied within a cylinder of the press wheel actuator 96. For example, in various examples, the pressure sensors may be provided in fluid communication with a fluid chamber defined within the cylinder (e.g., a piston-side chamber or a rod-side chamber of the cylinder) of the press wheel actuator 96. Alternatively, the pressure sensors may be installed at any other suitable location that allows the pressure sensors to measure the pressure of the fluid supplied within the press wheel actuator 96, such as by installing the pressure sensor in fluid communication with a hose or conduit configured to supply fluid to the press wheel actuator 96. Additionally or alternatively, the press wheel actuator 96 may be configured as a biasing element. In such instances, the position sensor may be configured as a strain gauge, force sensor, tension sensor, and/or any other linear sensor.

In the example illustrated in FIG. 6, as the press wheel 50 travels along the furrow 40, the vertical position of the press wheel 50 may vary based on the topography of the furrow 40. To accommodate the varied topography, such as the press wheel 50 moving to a higher position, the press wheel arm 54 can pivot clockwise about the rotational joint 98, such as by a first angle $A_1$ from the solid-lined position to the dashed-lined position shown in FIG. 6. Such pivoting of the press wheel arm 54 further causes the press wheel actuator 96 to be moved rearward relative to the direction of travel 16, from the solid-lined positions to the dashed-lined positions shown in FIG. 6. As the press wheel actuator 96 moves rearward, the press wheel actuator 96 may be compressed from the solid-lined positions to the dashed-lined positions shown in FIG. 6. It will be appreciated that the movements of the closing sensor assembly 100 are reversed when the press wheel 50 moves downwardly relative to the frame 32. Accordingly, the position sensor 102 may capture data indicative of the rotational position of the press wheel arm 54. As such, the data generated by the position sensors 102 may be correlated to the rotational position of the respective press wheel arm 54 about the associated rotational joint 98, the position of the associated press wheel 50 relative to the frame 32, the position of the associated press wheel 50 relative to the ground, and/or the depth of the associated furrow 40.

Figure 7:
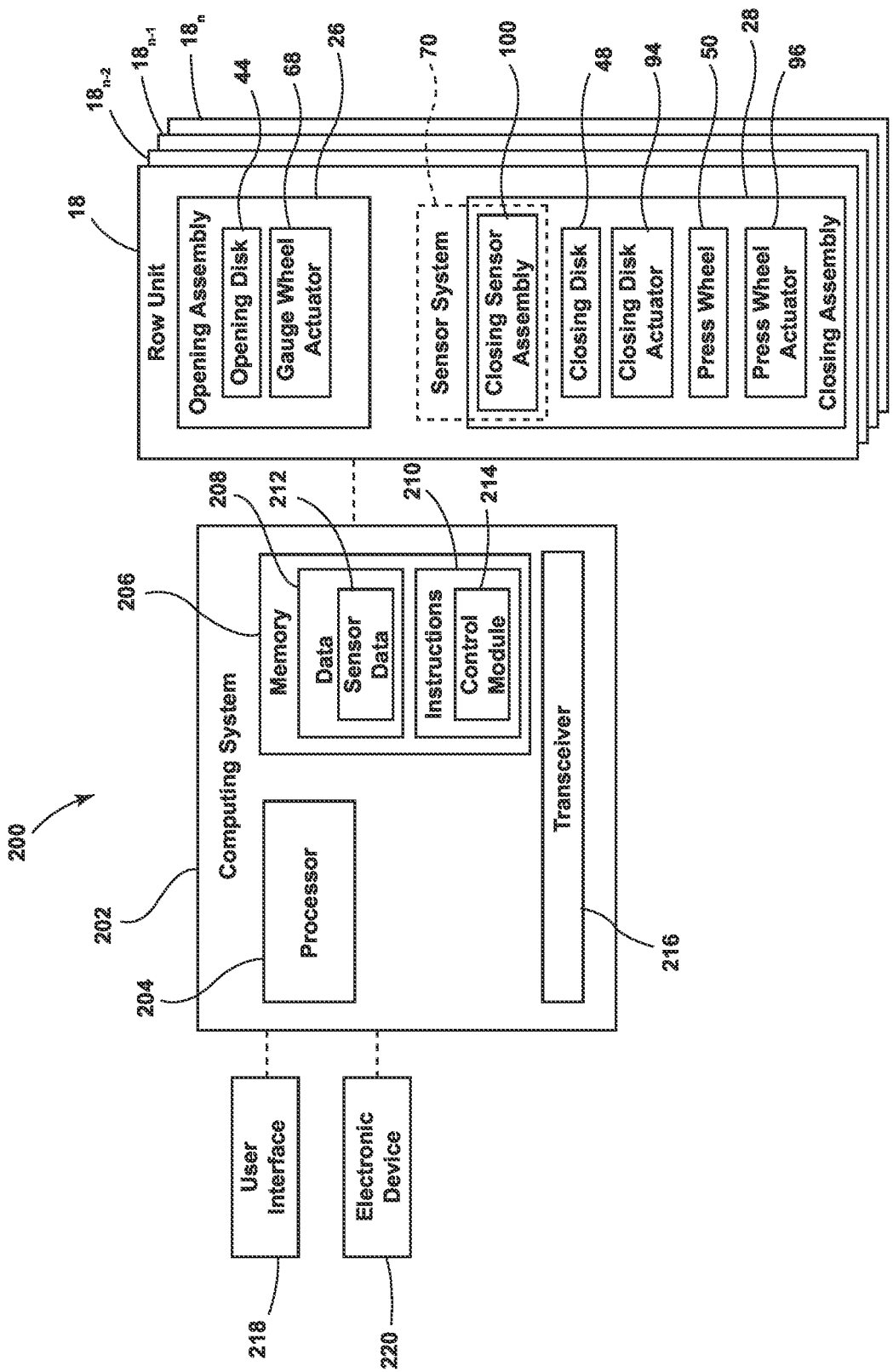
FIG. 7 illustrates a block diagram of a system for determining a position of various components of a row unit for a planting implement in accordance with aspects of the present subject matter.

Referring to FIG. 7, a block diagram of a system 200 for operating various agricultural implements is illustrated in accordance with aspects of the present subject matter. In general, the system 200 will be described herein with reference to the planting implement 10 and the row unit 18 described above with reference to FIGS. 1-6. However, it will be appreciated that the disclosed system 200 may generally be utilized with any planter or seeder having any suitable implement configuration, with row units 18 having any suitable row unit configuration, with seed meters having any suitable meter configuration, and/or with seed transport members have any suitable transport member configuration. For purposes of illustration, communicative links, or electrical couplings of the system 200 shown in FIG. 7 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency)

communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In several examples, the system 200 may include a computing system 202 and various other components configured to be communicatively coupled to and/or controlled by the computing system 202, such as one or more row units 18 and a respective sensor system 70 for each row unit 18. Accordingly, while one row unit 18 and sensor system 70 are illustrated in FIG. 7, it will be appreciated that the planting implement 10 may include any number of row units 18, 18n-2, 18n-i, 18n without departing from the scope of the present disclosure.

In general, the computing system 202 may comprise any suitable processor-based device, such as a computing device or any suitable combination of computing devices. Thus, in several embodiments, the computing system 202 may include one or more processors 204 and associated memory 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 206 of the computing system 202 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor 204, including data 208 that can be retrieved, manipulated, created, and/or stored by the processor 204 and instructions 210 that can be executed by the processor 204 and configure the computing system 202 to perform various computer-implemented functions, such as one or more algorithms and/or related methods. In addition, the computing system 202 may also include various other suitable components, such as a communications circuit or module, one or more input/output channels, a data/control bus, and/or the like.

In several embodiments, the data 208 may be stored in one or more databases. For example, the memory 206 may include a sensor database 212 for storing sensor data from one or more sensors. For example, the data 208 may be associated with the operation of the sensor system 70, which may capture data from the closing sensor assembly 100. During operation of the system 200, data from all or a portion of the sensors communicatively coupled to the computing system 202 may be stored (e.g., temporarily) within the sensor database 212 and subsequently used to determine one or more operating parameters or conditions associated with the operation of the system 200 and/or the planting implement 10.

Additionally, in several embodiments, the instructions 210 stored within the memory 206 of the computing system 202 may be executed by the processors 204 to implement a control module 214. In general, the control module 214 may be configured to sample and/or evaluate the data received from the various sensors communicatively coupled to the computing system 202 and/or other inputs received by the computing system 202. In various examples, the control module 214 may be configured to sample and/or evaluate the data from one or more of the sensors described herein continuously, periodically, or only as demanded. Based on the data, the control module 214 may provide instructions 210 to alter or manipulate one or more components of the row unit 18.

Figure 8:
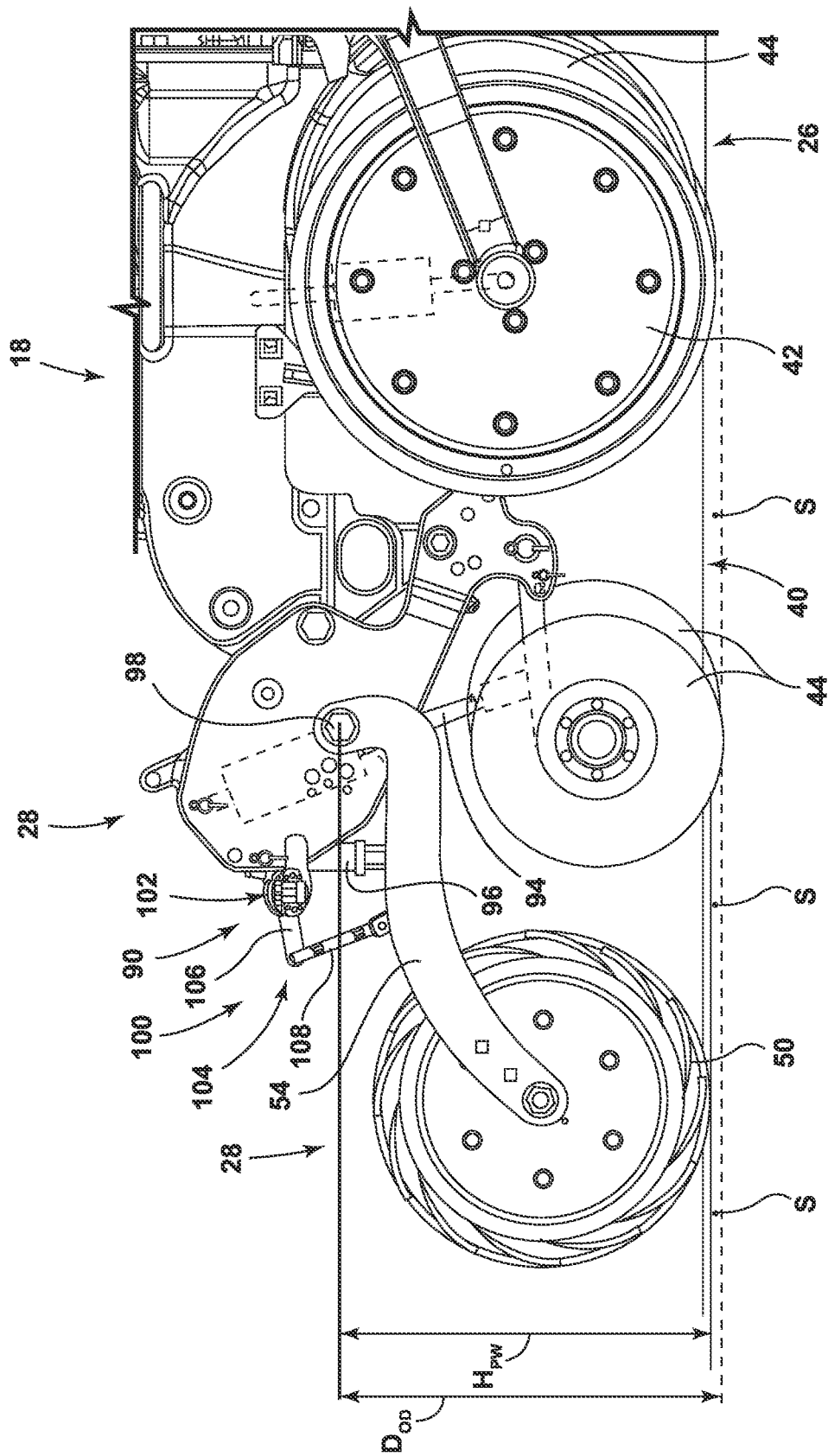
FIG. 8 illustrates a schematic view of the row unit in accordance with aspects of the present subject matter.

With reference to FIGS. 7 and 8, in operation, the opening assembly 26 of each row unit 18 can create a furrow 40 within the soil. A seed S may be placed within the furrow 40. With one or more seeds S within the furrow 40, the closing assembly 28 may return soil into the furrow 40 thereby closing the furrow 40 around the seed S. In addition, the closing assembly 28 may apply pressure to the soil to compact the soil.

During operation, the computing system 202 may receive an opening disk depth $D_{OD}$, and/or any other data related to the opening disk depth $D_{OD}$. In addition, the closing sensor assembly 100 may capture data that is indicative of the position of an associated press wheel arm 54 (e.g., the position of the respective press wheel 50 relative to the frame 32). Based on the data captured by the closing sensor assembly 100, the computing system 202 may determine a press wheel height $H_{pw}$ (e.g., the height of a bottom portion of the press wheel 50) relative to the component of the row unit 18 and/or the defined height relative to a pre-worked section of the field.

In some instances, the computing system 202 may determine a difference between the detected seed depth, based on the variance, and a defined seed depth. Based on the variance, the variance exceeding a defined range, the difference, and/or the difference deviating from a defined range, the computing system 202 may further be configured to perform a control action, such as notify an operator of the variance and/or adjust one or more components of the system 200. For example, the computing system 202 may alter one or more operating parameters of the opening assembly 26 and/or the closing assembly 28. For instance, the computing system 202 may increase a defined opening disk depth through an opening disk actuator 68 so that the seed may be positioned at a defined depth below the surface of the soil.

Referring back to FIG. 7, the computing system 202 may also include a transceiver 216 to communicate with wired and/or wireless communication with any of the various other system components described herein. For instance, one or more communicative links or interfaces (e.g., one or more data buses) may be provided between the transceiver 216 and each row unit 18 to allow the computing system 202 to transmit control signals for controlling the operation of such components. Similarly, one or more communicative links or interfaces (e.g., one or more data buses) may be provided between the transceiver 216 and the sensor system 70 to allow the associated sensor data to be transmitted to the computing system 202.

Furthermore, in some embodiments, the system 200 may also include a user interface 218 in communication with the computing system 202. In some cases, the user interface 218 may be configured to provide feedback (e.g., notifications associated with the operational parameters of each row unit 18) to the operator of the planting implement 10. As such, the user interface 218 may include one or more feedback devices, such as display screens, speakers, warning lights, and/or the like, which are configured to communicate such feedback. In addition, some embodiments of the user interface 218 may include one or more input devices, such as touchscreens, keypads, touchpads, knobs, buttons, sliders, switches, mice, microphones, and/or the like, which are configured to receive user inputs from the operator, which may be a defined seed depth and/or a defined opening disk depth. In various examples, the user interface 218 may be positioned within a cab of a work vehicle configured to tow the planting implement 10 across the field. However, in alternative embodiments, the user interface 218 may have any suitable configuration and/or be positioned in any other suitable location.

Further, the computing system 202 may also communicate via wired and/or wireless communication with one or more remote electronic devices 220 through the transceiver 216. The electronic device 220 may include a display for illustrating information to a user. It will be appreciated that the electronic device 220 may be any one of a variety of computing devices and may include a processor and memory. For example, the electronic device 220 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

It will be appreciated that, in general, the computing system 202 of the disclosed system 200 may correspond to any suitable computing devices that is configured to function as described herein. In several embodiments, the computing system 202 may form part of an active planting system configured to perform a planting operation, such as by corresponding to a vehicle controller of a work vehicle configured to tow an associated planting implement 10 and/or an associated implement controller of the planting implement 10. Alternatively, the computing system 202 may comprise a separate computing devices configured to be used primarily for the purpose of performing the various calibration methods and/or routines described herein.

It should additionally be appreciated that the computing system 202 may correspond to an existing controller of the planting implement 10 or an associated work vehicle or the computing system 202 may correspond to a separate processing device. For instance, in some cases, the computing system 202 may form all or part of a separate plug-in module that may be installed within the planting implement 10 or associated work vehicle to allow for the disclosed system 200 and method to be implemented without requiring additional software to be uploaded onto existing control devices of the planting implement 10 or the associated work vehicle.

Figure 9:
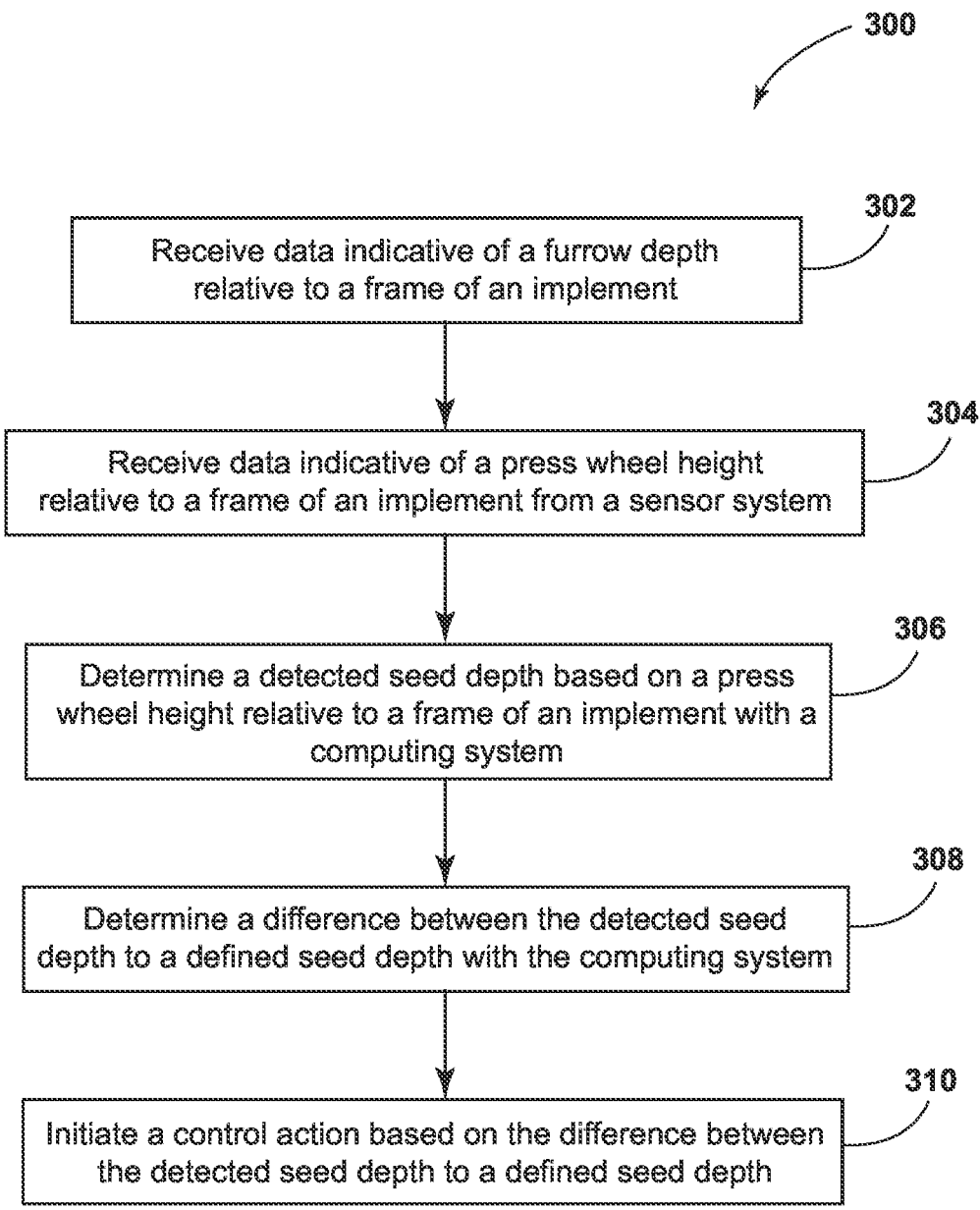
FIG. 9 illustrates a flow diagram of a method for an agricultural operation in accordance with aspects of the present subject matter.

Referring now to FIG. 9, a flow diagram of some examples of a method 300 for an agricultural operation is illustrated in accordance with aspects of the present subject matter. In general, the method 300 will be described herein with reference to the planting implement 10 and one or more row units 18 described above with reference to FIGS. 1-8. However, the disclosed method 300 may generally be utilized with any suitable vehicle and/or implement. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated in FIG. 9, at (302), the method 300 can include receiving an opening disk depth relative to a frame of an implement, which may be inputted by an operator and/or otherwise received by the computing system.

At (304), the method 300 can include receiving data indicative of a press wheel height relative to a frame of an implement from a sensor system. As provided herein, the sensor system may include a closing sensor assembly in operative association with the press wheel of one or more of the row units 18. In various examples, each closing sensor assembly may capture data that is indicative of the position of the respective press wheel relative to the frame).

At (306), the method 300 can include determining a detected seed depth based on the press wheel height relative to the frame of the implement with a computing system.

At (308), the method 300 can include determining a difference between the detected seed depth to a defined seed depth with the computing system. In some instances, the computing system may determine the difference between the detected seed depth, based on the variance, and a defined seed depth. In various instances, the defined seed depth may be found or selected through a user interface, a remote electronic device, and/or in any other suitable way, such as from a predetermined look-up table stored in the computing system. In some instances, the look-up tables may be based on the agricultural product being deposited within the field and/or an application map that is stored within the computing system.

At (310), the method 300 can include initiating a control action based on the variance, the variance exceeding a defined range, the difference, and/or the difference deviating from a defined range, the computing system may further be configured to perform a control action, such as notify an operator of the variance and/or adjust one or more components of the system. For example, the computing system may alter one or more operating parameters of the opening assembly and/or the closing assembly. For instance, the computing system may alter a position of an opening assembly component or a closing assembly component so that the seed may be positioned at a defined depth below the surface of the soil.

In various examples, the method 300 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the position of the ground-engaging tool and/or any other component of the residue manager assembly. In some instances, the vehicle learning engine may allow for changes to the position of the ground-engaging tool and/or any other component of the residue manager assembly to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, or a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for a row unit of a planting implement, the system comprising:
   a frame;
   a closing sensor assembly comprising a rotational sensor configured to capture data indicative of a rotational position of a press wheel arm of a closing assembly relative to the frame; and
   a computing system communicatively coupled to the closing sensor assembly, the computing system being configured to:
      receive the data from the closing sensor assembly;
      determine a press wheel height relative to the frame;
      determine a height variance between an opening disk depth and the press wheel height; and
      generate a control action based on the height variance.

2. The system of claim 1, wherein the closing assembly is supported relative to the frame, the closing assembly configured to place soil into a furrow.

3. The system of claim 1, wherein the computing system is further configured to determine a detected seed depth based at least in part on the height variance.

4. The system of claim 1, wherein a press wheel is operably coupled with the press wheel arm.

5. The system of claim 1, wherein the closing sensor assembly further comprises:
   a first sensor link extending between a first proximal end portion and a first distal end portion, the first proximal end portion of the first sensor link coupled to the rotational sensor; and
   a second sensor link extending between a second proximal end portion and a second distal end portion, the second proximal end portion of the second sensor link coupled to the first distal end portion of the first sensor link, the second distal end portion of the second sensor link coupled to the press wheel arm,
   wherein the rotational sensor is configured to capture data indicative of the rotational position of the press wheel arm based at least in part on movement of the first sensor link relative to the rotational sensor.

6. The system of claim 1, further comprising:
   a bracket operably coupled with the frame and supporting the rotational sensor.

7. The system of claim 1, further comprising:
   an actuator operably coupled with the press wheel arm and the frame, and wherein the rotational sensor comprises a position sensor positioned within the actuator.

8. A method for an agricultural operation, the method comprising:
   receiving, from a rotational sensor, data indicative of a rotational position of a press wheel arm of a closing assembly relative to a frame indicating a press wheel height relative to the frame of an implement;
   determining, with a computing system, a detected seed depth based on a press wheel height relative to the frame of an implement; and
   initiating, with the computing system, a control action based on a difference between the detected seed depth to a defined seed depth, wherein the control action comprises altering a position of an opening assembly component or a closing assembly component.

9. The method of claim 8, further comprising:
   determining, with the computing system, a difference between the detected seed depth to the defined seed depth.

10. The method of claim 8, wherein the control action comprises presenting a notification on a user interface.

11. A system for a row unit of a planting implement, the system comprising:
    a frame;
    a press wheel;
    a press wheel arm pivotably coupling the press wheel to the frame; and
    a closing sensor assembly configured to capture data indicative of a magnitude of rotation of the press wheel relative to the frame, the closing sensor assembly comprising:
       a rotational sensor operably coupled to the frame;
       a first sensor link extending between a first proximal end portion and a first distal end portion, the first proximal end portion of the first sensor link coupled to the rotational sensor; and
       a second sensor link extending between a second proximal end portion and a second distal end portion, the second proximal end portion of the second sensor link coupled to the first distal end portion of the first sensor link, the second distal end portion of the second sensor link coupled to the press wheel arm,
       wherein the rotational sensor is configured to capture data indicative of a rotational position of the press wheel arm based at least in part on movement of the first sensor link relative to the rotational sensor.

12. The system of claim 11, wherein the closing sensor assembly includes a sensor configured to capture data indicative of the rotational position of the press wheel arm based at least in part on movement of the first sensor link relative to the rotational sensor.

13. The system of claim 12, further comprising:
    a computing system communicatively coupled to the closing sensor assembly, the computing system being configured to:

receive the data from the closing sensor assembly;
determine a press wheel height relative to the frame;
determine a variance between an opening disk depth and the press wheel height; and
generate a control action based on the variance.

14. The system of claim 13, further comprising:
a bracket operably coupled with the frame and supporting a sensor of the closing sensor assembly.

* * * * *